United States Patent
Wang et al.

(10) Patent No.: US 9,800,290 B2
(45) Date of Patent: Oct. 24, 2017

(54) CHANNEL DETECTION METHOD AND SYSTEM THEREOF

(71) Applicant: REALTEK SEMICONDUCTOR CORP., Hsinchu (TW)

(72) Inventors: Shih-Wei Wang, Pingtung County (TW); Liang-Wei Huang, Hsinchu (TW); Ching-Yao Su, Taichung (TW); Sheng-Fu Chuang, Taichung (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/005,764

(22) Filed: Jan. 25, 2016

(65) Prior Publication Data

US 2016/0233920 A1   Aug. 11, 2016

(30) Foreign Application Priority Data

Feb. 11, 2015  (TW) .............................. 104104545 A

(51) Int. Cl.
  *H04B 3/46*    (2015.01)
  *H04B 3/23*    (2006.01)
  *H04B 3/493*   (2015.01)

(52) U.S. Cl.
  CPC ............. *H04B 3/237* (2013.01); *H04B 3/231* (2013.01); *H04B 3/493* (2015.01)

(58) Field of Classification Search
  CPC ..................................................... H04B 3/237
  USPC ....................................................... 375/224
  See application file for complete search history.

(56) References Cited

U.S. PATENT DOCUMENTS

2006/0007993 A1\* 1/2006 Wang ....................... H04B 3/46
                                                                    375/224
2006/0239385 A1   10/2006 Hofmeister
2009/0259422 A1   10/2009 Yen et al.

FOREIGN PATENT DOCUMENTS

| CN | 100525264 C  | 8/2009  |
| CN | 102411140 A  | 4/2012  |
| TW | 470888       | 1/2002  |
| TW | 200713841    | 4/2007  |
| TW | 201014224 A1 | 4/2010  |
| TW | 201250273 A1 | 12/2012 |

\* cited by examiner

*Primary Examiner* — Lihong Yu
(74) *Attorney, Agent, or Firm* — Li & Cai Intellectual Property (USA) Office

(57) ABSTRACT

A channel detection method for an echo canceller of a communication device is provided. The method includes the following steps. A first detection signal is transmitted to an end of a channel coupled to the communication device. A plurality of taps corresponding to a reflected signal of the first detection signal are received by an echo canceller at the end of the channel. The taps corresponding to the reflected signal are compared with a reference value corresponding to each of the taps so as to determine whether each of the taps is larger than or equal to the corresponding reference value. When the tap is determined to be larger than or equal to the reference value corresponding to the tap, the tap and a position of the tap are recorded.

13 Claims, 3 Drawing Sheets

CHANNEL DETECTION METHOD AND SYSTEM THEREOF

BACKGROUND

1. Technical Field

The present disclosure generally relates to a channel detection method and, more particularly, to a channel detection method for an echo canceller and a system using the channel detection method.

2. Description of Related Art

In a cable communication system, channel detection helps the user to determine whether a channel is open, short, impedance mismatched or normal. If there is any problem of connection, service providers or users may use channel detection to confirm whether there is any problem in the channel to clarify if the problem of connection is attributed to the channel itself (for example, the cable) and/or to point out the part of the channel where the problem takes place.

Conventionally, a pseudo-noise sequence (PN-sequence) is transmitted with auto-correlation to probe the channel conditions by determining the reflected signal in the channel and whether there is impedance mismatch in the channel.

Generally, in a cable communication system, additional hardware implementation is required for the calculation of auto-correlation. Moreover, with auto-correlation, each process only obtains one point in the reflected signal. Conventionally, it requires additional hardware implementation and longer testing time to realize channel detection by auto-correlation of a pseudo-noise sequence. However, if the communication devices (such as transceivers) at both ends of a channel perform channel detection at the same time, different pseudo-noise sequences are required to prevent cross-talk and to save time. In other words, additional hardware implementations are required for both communication devices so that the communication devices are provided with different pseudo-noise sequences. Such additional cost and testing time are not welcome to both the service providers and the users.

SUMMARY

One embodiment of the present disclosure provides a channel detection method for at least one echo canceller of a communication device, including the steps as follows. First, a first detection signal is transmitted to an end of a channel coupled to the communication device. Then, a plurality of taps corresponding to a reflected signal of the first detection signal are received by at least one echo canceller at the end of the channel. After, each of the plurality of taps corresponding to the reflected signal is compared with a reference value corresponding to each of the plurality of taps so as to determine whether each of the plurality of taps is larger than or equal to the corresponding reference value. When the tap is determined to be larger than or equal to the reference value corresponding to the tap, the tap and a position of the tap are recorded.

One embodiment of the present disclosure provides a channel detection system. The channel detection system includes a first communication device. The first communication device includes a transceiving module, a calculation unit and at least one echo canceller. The at least one echo canceller is coupled to the transceiving module. The calculation unit is coupled to the at least one echo canceller. The transceiving module transmits a first detection signal to an end of a channel coupled to the transceiving module. The at least one echo canceller receives, through the transceiving module, a plurality of taps corresponding to a reflected signal of the first detection signal at the end of the channel. The calculation unit compares each of the plurality of taps corresponding to the reflected signal with a corresponding reference value so as to determine whether each of the plurality of taps is larger than or equal to the corresponding reference value. When the tap is determined to be larger than or equal to the corresponding reference value, the tap and a position of the tap are recorded.

As stated above, the channel detection method and the channel detection system according to one embodiment of the present disclosure perform channel detection with the existing hardware implementations of communication devices. In other words, the cost of hardware implementations is lower than that for conventional auto-correlation. On the other hand, the echo canceller of the present disclosure operates based on first-order convergence calculation and is thus faster as compared to conventional auto-correlation operations. Accordingly, in the present disclosure, channel detection can be achieved in a dual-ended detection mode with different delay times to prevent mutual interference. On the whole, the present disclosure has advantages such as low cost and time-saving.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
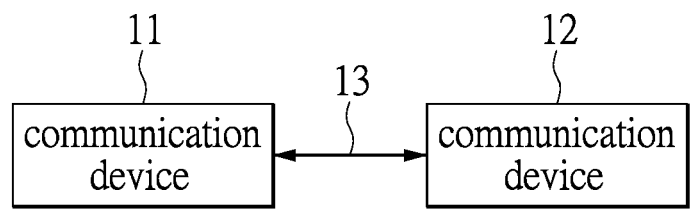
FIG. 1 is a block diagram of a channel detection system according to one embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

In one embodiment of the present disclosure, a channel detection method and a channel detection system perform channel detection with the existing hardware implementations of communication devices. The channel detection system uses an echo canceller to receive a reflected signal and a reference value to determine whether a channel is normal or not. Detailed descriptions are provided herein.

With reference to FIG. 1, FIG. 1 is a block diagram of a channel detection system according to one embodiment of the present disclosure. The channel detection system 1 includes communication devices 11 and 12. The communication devices 11 and 12 are connected through a channel 13 to provide information exchange (for example, one or plural commands and/or data). The communication device 11 or 12 is an independent or discrete device, which may be combined with or be coupled to the other electronic devices, such as personal computers, servers, car-use electronic devices or other devices with cable communication. In one embodiment of the present disclosure, the channel detection system 1 is exemplified by a gigabit Ethernet system. However, the person with ordinary skill in the art may use other systems within the scope of the present disclosure.

It should be noted that the communication devices 11 and 12 have a first identification code and a second identification code with different delay times, respectively, to prevent mutual interference during detection. The first identification code and the second identification code are, for example, physical identifications (PHY IDs).

Figure 2:
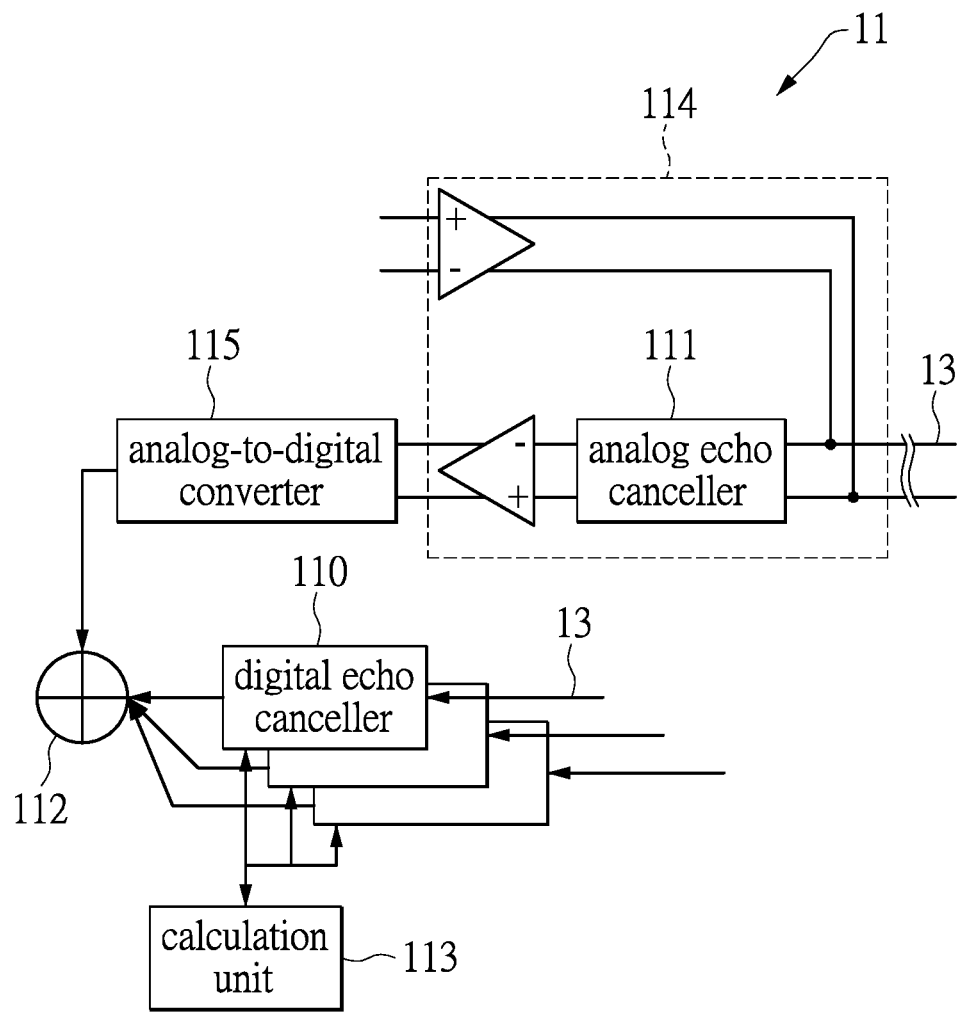
FIG. 2 is a schematic diagram of a communication device using an echo canceller for channel detection according to one embodiment of the present disclosure.

Afterwards, with reference to FIG. 2, FIG. 2 is a schematic diagram of a communication device using an echo canceller for channel detection according to one embodiment of the present disclosure. In a gigabyte Ethernet system, the communication device 11 includes at least one digital echo canceller 110, a transceiving module 114, an analog-to-digital converter 115, an adder 112 and a calculation unit 113. The transceiving module 114 includes an analog echo canceller 111. The communication device 11 is coupled to a channel 13 through the transceiving module 114. The analog-to-digital converter 115 is coupled to the transceiving module 114. The adder 112 is coupled to the analog-to-digital converter 115. The digital echo canceller 110 is coupled to the adder 112. The calculation unit 113 is coupled to the digital echo canceller 110.

The transceiving module 114 of the communication device 11 transmits a first detection signal to an end of the channel 13 coupled to the communication device 11 and receives a reflected signal corresponding to the first detection signal or a second detection signal transmitted from the other end of the channel 13. In one embodiment of the present disclosure, the channel 13 is a cable. In the transceiving module 114, the analog echo canceller 111 eliminates the reflected signal of the first detection signal transmitted from the transceiving module 114.

The analog-to-digital converter 115 includes logic and/or coding circuitry for converting the reflected signal received by the transceiving module 114 from analog to digital.

The digital echo canceller 110 includes logic and/or coding circuitry. Generally, the communication device in a gigabyte Ethernet system includes a digital echo canceller. In one embodiment of the present disclosure, the digital echo canceller 110 receives, in turn, a plurality of taps of the reflected signal through the transceiving module 114 and stores or updates the taps in a register (not shown) in the digital echo canceller 110 to complete signal convergence.

Moreover, the digital echo canceller 110 according to one embodiment of the present disclosure further provides signal detection. More particularly, signal detection continues detecting whether the transceiving module 114 has received the second detection signal transmitted from the communication device 12 when the channel detection system 1 is in a dual-ended detection mode. In one embodiment of the present disclosure, the communication device 11 or 12 includes a plurality of digital echo cancellers 110 that are connected in series. For example, each of the digital echo cancellers 110 includes four registers. When the taps of the reflected signal fill a first to a fourth register of a digital echo canceller 110, a first register of another digital echo canceller 110 is used to proceed storing the taps.

The adder 112 includes logic and/or coding circuitry for comparing the taps of the reflected signal received by the digital echo canceller 110.

The calculation unit 113 includes logic and/or coding circuitry for comparing in turn the taps of the reflected signal stored in the digital echo canceller 110 to corresponding reference values of the taps predetermined by the calculation unit 113. The calculation unit 113 further includes a multiplexer (not shown) for switching to access the taps stored in the register in the digital echo canceller 110. The reference values are stored in a memory or a memory unit (not shown) in the communication device 11 in advance. The memory or the memory unit is known to the person with ordinary skill in the art and thus description thereof is not repeated herein.

Figure 3:
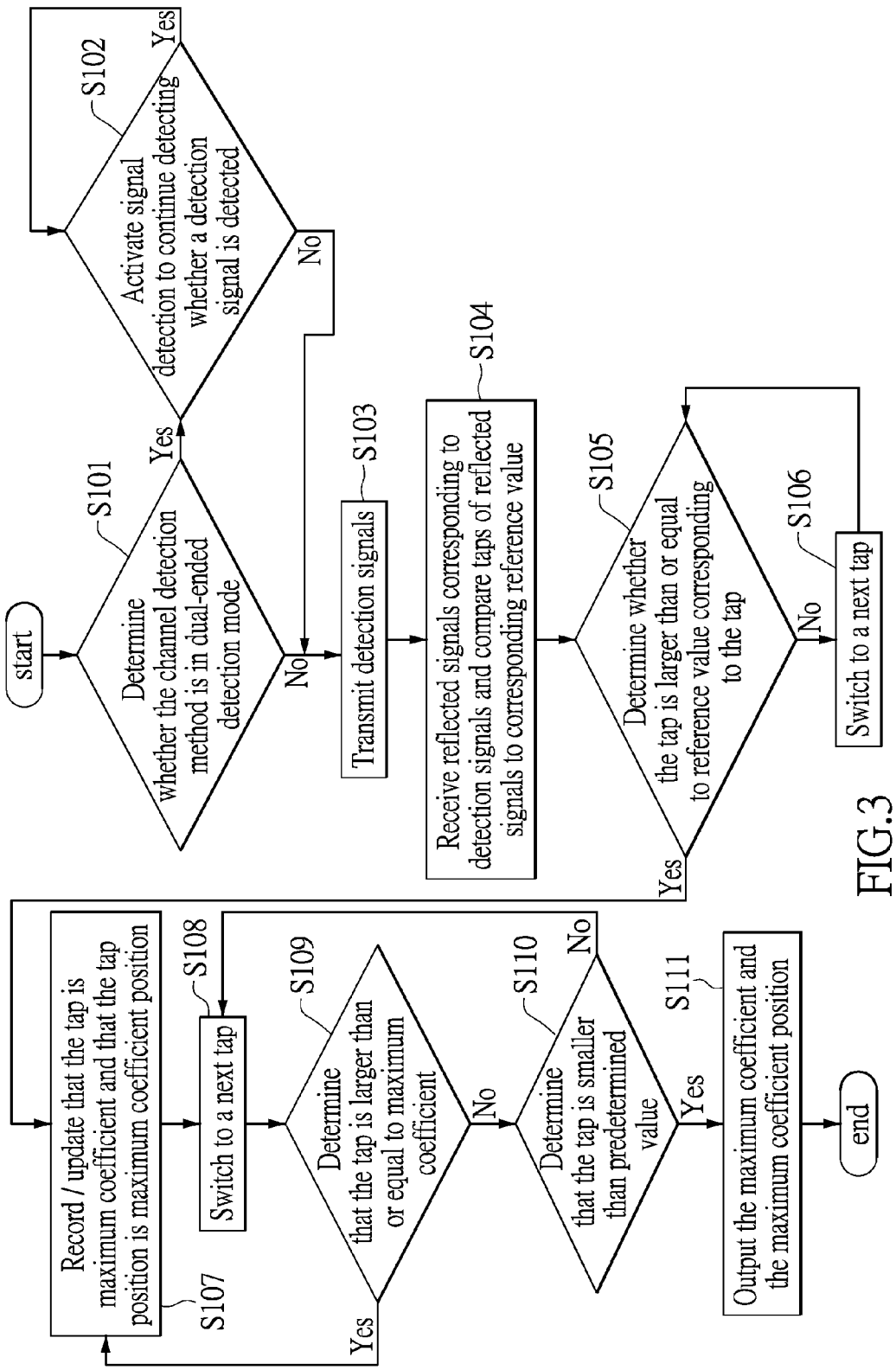
FIG. 3 is a flowchart of a channel detection method according to one embodiment of the present disclosure.

Next, with reference to FIG. 3, FIG. 3 is a flowchart of a channel detection method according to one embodiment of the present disclosure. The channel detection method includes steps herein. In Step S101, it is determined whether the channel detection method is in a dual-ended detection mode. In Step S102, signal detection is activated to continue detecting whether a detection signal is detected. In Step S103, detection signals are transmitted. In Step S104, reflected signals corresponding to the detection signals are received in turn and a plurality of taps of the reflected signals are compared to corresponding reference values respectively. In Step S105, each of the taps is determined to be larger than or equal to the reference values corresponding to the taps. Step S106 switches to a next tap. In Step S107, that the tap is a maximum coefficient and that the tap position is a maximum coefficient position are recorded/updated. Step S108 switches to a next tap. In Step S109, the tap is determined to be larger than or equal to the maximum coefficient. In Step S110, the tap is determined to be smaller than a predetermined value. In Step S111, the maximum coefficient and the maximum coefficient position are outputted.

In Step S101, with reference to FIG. 1, 2 and FIG. 3, the first communication device 11 determines whether the channel detection method is in a dual-ended detection mode when the communication device 11 of the channel detection system 1 is to activate channel detection. If the communication device 11 determines that the channel detection method is in a dual-ended detection mode, the method proceeds to Step S102; otherwise, the method proceeds to Step S103 if the communication device 11 determines that the channel detection method is not in a dual-ended detection mode.

In Step S102, the digital echo canceller 110 of the communication device 11 further activates signal detection to continue detecting whether a second detection signal transmitted from the communication device 12 is detected. If the digital echo canceller 110 stops receiving the second detection signal, it is determined to transmit the first detection signal to the communication device 12. It should be noted that, in practical cases, the communication device 11 and the communication device 12 have, respectively, a first identification code and a second identification code with different delay times. Therefore, the times at which the first detection signal and the second detection signal are transmitted are staggered to prevent interference due to simultaneous transmission or interruption due to simultaneous mutual detection. The first identification code and the second identification code have, for example, a delay of 2 ms and a delay of 6 ms, respectively.

Then, in Step S103, the communication device 11 starts to transmit a first detection signal when the digital echo canceller 110 determines to transmit the first detection signal to the communication device 12. It should be noted that, in one embodiment of the present disclosure, Step S102 and Step S103 can be performed alternately. More particularly, the first detection signal transmitted by the transceiving module 114 corresponding to the digital echo canceller 110 of the communication device 11 and the second detection signal transmitted by the transceiving module (not shown) corresponding to the digital echo canceller (not shown) of the communication device 12 can be transmitted alternately.

For example, under the dual-ended detection mode, the transceiving module 114 transmits the first detection signal and the digital echo canceller 110 stores the taps of the reflected signal when the first digital echo canceller 110 of the communication device 11 is used for testing (for example, along the first path). Next, after the first digital echo canceller 110 of the communication device 12 detects that the first detection signal from the communication device 11 has been transmitted, the first digital echo canceller of the communication device 12 takes over testing (along the first path). Meanwhile, the transceiving module transmits the second detection signal and the digital echo canceller stores the taps of the reflected signal. Then, when the second digital echo canceller of the communication device 11 detects that the second detection signal from the communication device 12 has been transmitted, the second digital echo canceller of the communication device 11 transmits the first detection signal (for example, along the second path).

Simply put, under the dual-ended detection mode, after the first digital echo canceller 110 of the communication device 11 finishes testing, the communication device 12 takes over without switching to the second digital echo canceller 110 of the communication device 11 to continue testing. However, the person with ordinary skill in the art should understand that the first and the second digital echo cancellers 110 of the communication device 11 may also be used for testing before the first and the second digital echo cancellers of the communication device 12 are used for testing. However, the present disclosure is not limited to thereto.

In Step S104, the digital echo canceller 110 of the communication device 11, for example, receives and stores in turn the taps of the reflected signal corresponding to the first detection signal transmitted from the communication device 11 and then transmits the taps to the calculation unit 113 to compare with reference values corresponding to the taps.

Next, in Step S105, the calculation unit 113 determines whether the taps are larger than or equal to the reference values corresponding to the taps. More particularly, the calculation unit 113 uses a multiplexer (not shown) for switching to access to the taps of the reflected signal stored in the register in the digital echo canceller 110 and determines whether the taps of the reflected signal are larger than or equal to the reference values corresponding to the taps. If the calculation unit 113 determines that the taps are larger than or equal to the reference values, the method proceeds to Step S107; otherwise, the method proceeds to Step S106 if the calculation unit 113 determines that the taps are not larger than or equal to the reference values.

In Step S106, the calculation unit 113 switches to access to a next tap of the reflected signal stored in the digital echo canceller 110.

Figure 4:
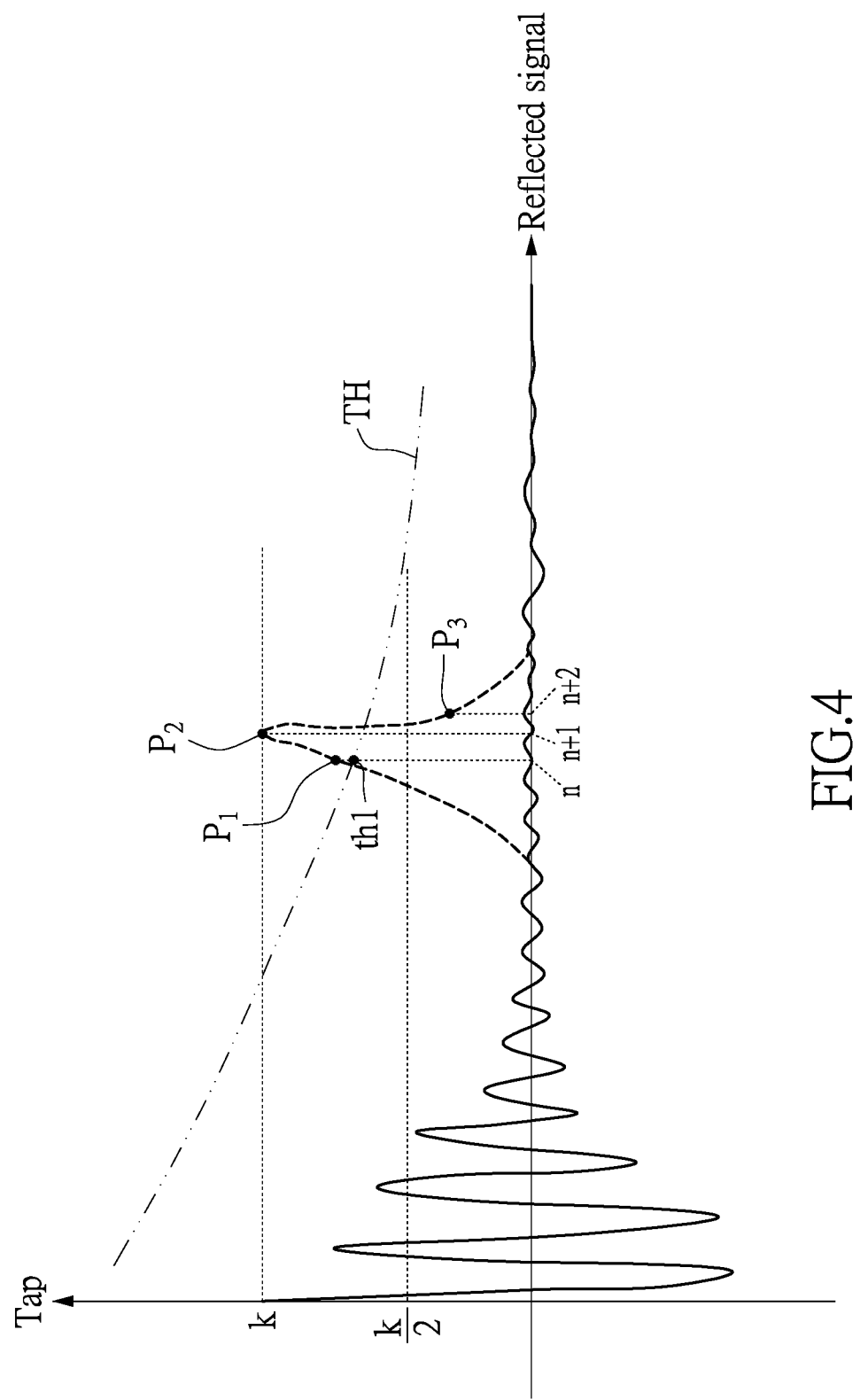
FIG. 4 shows a process of determination in a channel detection method according to one embodiment of the present disclosure.

With reference to FIG. 3 and FIG. 4, FIG. 4 shows a process of determination in a channel detection method according to one embodiment of the present disclosure. More particularly, the solid line in FIG. 4 denotes the relation between the taps and the tap positions corresponding to the reflected signal received by a normal cable and the dotted line denotes the relation between the taps and the tap positions corresponding to the reflected signal received by an abnormal cable. The curve TH of reference values is formed by the taps (P1, P2, P3) and reference values corresponding to the tap positions.

In Step S107, that the tap is a maximum coefficient and that the tap position is a maximum coefficient position are recorded/updated.

In Step S107, when the calculation unit 113 determines that the nth tap P1 of the reflected signal is larger than (or equal to) the reference value th1 corresponding to tap, the tap P1 and the (nth) tap position are recorded as the maximum coefficient and the maximum coefficient position, respectively. However, in practical cases, the maximum coefficient and the maximum coefficient position are used to acquire the status of the reflected signal at a relative position in the channel 13 (or cable). For example, if the maximum coefficient position is for the 20th tap, the user can figure out that there may be a problem at the position corresponding to the 16th meter in the cable because a tap position measures 0.8 meters in length. However, when the calculation unit 113 determines that there is a problem at the position corresponding to the nth tap position, the position where there is a problem may eventually be located after the position corresponding to the nth tap because the problem usually occurs at a maximum tap position. Therefore, the method now proceeds to the subsequent steps to find out the actual position where there is a problem.

In Step S108, the calculation unit 113 further switches to access to a next tap, as described with Step S106.

Next, in Step S109, the calculation unit 113 further determines whether a next tap of the reflected signal is larger than or equal to the maximum coefficient. In practical cases, the neighboring positions of a position where there is a problem are also affected. Therefore, it is not accurate enough if one determines that there is a problem at a position corresponding to a tap being larger than or equal to the reference value for the first time. With reference to FIG. 4, in Step S109, the (n+1)th tap P2 is compared with the nth tap P1 being a current maximum coefficient. If the (n+1)th tap P2 is larger than the nth tap P1 being the current maximum coefficient, it means that the nth tap P1 is not really a maximum coefficient (i.e., the position corresponding thereto is not really where the problem takes place). In other words, when the calculation unit 113 determines that the next tap (for example, k) of the reflected signal is larger than or equal to the maximum coefficient, the method proceeds to Step S107 to update the maximum coefficient as k and the maximum coefficient position as the (n+1)th tap P2 for further comparison. On the other hand, when the calculation unit 113 determines that the next tap (i.e., the (n+1)th tap P2) of the reflected signal is smaller than the maximum coefficient (the nth tap P1), the method proceeds to Step S110.

In Step S110, when the calculation unit 113 determines that the next tap is smaller than the maximum coefficient, the next tap is further determined as to whether it is smaller than a predetermined value. With reference to FIG. 4, when the (n+2)th tap P3 is smaller than the (n+1)th tap P2, it means that the most likely position where there is a problem corresponds to the (n+1)th tap P2. But, in practical cases, there may be some inaccuracy when the digital echo canceller 110 receives and stores the taps of the reflected signal. If the calculation unit 113 determines that the (n+2)th tap P3 is smaller than the (n+1)th tap P2, it may lead to a mistake in determining whether the position corresponding to the (n+1)th tap is a position where there is a problem. Therefore, in one embodiment of the present disclosure, Step S110 is performed to further confirm whether the maximum coefficient represents the position where there is really a problem. It should be noted that, in one embodiment of the present disclosure, the predetermined value is half (i.e., k/2) of the maximum coefficient. However, the person with ordinary skill in the art should understand that the present disclosure is not limited to the previous values of the taps.

In Step S111, the maximum coefficient and the maximum coefficient position are outputted.

Last, in Step S111, when the (n+2)th tap P3 is determined to be smaller than the predetermined value k/2, the maximum coefficient k and the maximum coefficient position (the (n+1)th tap position) for further detection.

[Functions of the Present Disclosure]

As stated above, the channel detection method and the channel detection system according to one embodiment of the present disclosure perform channel detection with the existing hardware implementations of communication devices. In other words, the cost of hardware implementations is lower than that for conventional auto-correlation. On the other hand, the echo canceller of the present disclosure operates based on a first-order convergence calculation and is thus faster as compared to conventional auto-correlation operations.

It should be noted that channel detection according to one embodiment of the present disclosure can be achieved in a dual-ended detection mode with different delay times to prevent mutual interference. On the whole, the present disclosure has advantages such as low cost and time-saving.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A channel detection method for at least one echo canceller of a communication device, comprising:
    transmitting a first detection signal to an end of a channel coupled to said communication device;
    receiving, by said at least one echo canceller, a plurality of taps corresponding to a reflected signal of said first detection signal at said end of said channel;
    comparing each of said plurality of taps corresponding to said reflected signal with a corresponding reference value so as to determine whether each of said plurality of taps is larger than or equal to said corresponding reference value;
    recording one of said plurality of taps as a maximum coefficient and recording a position of said tap recorded as the maximum coefficient as a maximum coefficient position, when one of said plurality of taps is determined to be larger than or equal to said corresponding reference value;
    determining whether a next tap of said reflected signal is larger than or equal to said maximum coefficient; and
    determining whether said next tap is smaller than a predetermined value when said next tap is determined to be smaller than said maximum coefficient, wherein said predetermined value is half of said maximum coefficient.

2. The channel detection method of claim 1, further comprising:
    switching to a next tap to repeat determining whether said next tap is larger than or equal to a next reference value corresponding to said next tap when said tap is determined to be smaller than said reference value corresponding to said tap.

3. The channel detection method of claim 1, further comprising:
    updating said maximum coefficient to said next tap and updating said maximum coefficient position to a position of said next tap when said next tap is determined to be larger than or equal to said maximum coefficient.

4. The channel detection method of claim 1, further comprising:
    outputting said maximum coefficient and said maximum coefficient position when said next tap is determined to be smaller than said predetermined value.

5. The channel detection method of claim 1, further comprising:
    determining whether said channel detection method is in a dual-ended detection mode before transmitting said first detection signal.

6. The channel detection method of claim 5, further comprising:
    activating a signal detection to continue detecting whether a second detection signal is received when said channel detection method is determined to be in said dual-ended detection mode.

7. A channel detection system, comprising:
    a first communication device, comprising:
        a transceiving module for transmitting a first detection signal to an end of a channel coupled to said transceiving module;
        at least one echo canceller coupled to said transceiving module for receiving, through said transceiving module, a plurality of taps corresponding to a reflected signal of said first detection signal at said end of said channel; and
        a calculation unit coupled to said at least one echo canceller for comparing each of said plurality of taps corresponding to said reflected signal with a corresponding reference value so as to determine whether each of said plurality of taps is larger than or equal to said corresponding reference value;
        wherein when one of said plurality of taps is determined to be larger than or equal to said corresponding reference value, the calculation unit records said tap as a maximum coefficient and records a position of said tap recorded as the maximum coefficient as a maximum coefficient position, and further determines whether a next tap of said reflected signal is larger than or equal to said maximum coefficient;
        wherein said calculation unit determines whether said next tap is smaller than a predetermined value when said calculation unit determines that said next tap is smaller than said maximum coefficient, said predetermined value being half of said maximum coefficient.

8. The channel detection system of claim 7, wherein said maximum coefficient is updated to said next tap and said maximum coefficient position is updated to a position of said next tap when said next tap is determined to be larger than or equal to said maximum coefficient.

9. The channel detection system of claim 7, wherein said maximum coefficient and said maximum coefficient position are outputted when said calculation unit determines that said next tap is smaller than said predetermined value.

10. The channel detection system of claim 7, further comprising:
a second communication device coupled to another end of said channel;
wherein whether said channel detection system is in a dual-ended detection mode is determined before said first communication device transmits said first detection signal.

11. The channel detection system of claim 10, wherein said at least one echo canceller activates a signal detection to continue detecting whether a second detection signal transmitted by said second communication device is received when said first communication device determines that said channel detection system is in said dual-ended detection mode.

12. The channel detection system of claim 11, wherein said first communication device and said second communication device are provided, respectively, with a first identification code and a second identification code having different delay times.

13. The channel detection system of claim 7, wherein said first communication device uses a second register in said at least one echo canceller to continue receiving remaining ones of said plurality of taps when a first register in said at least one echo canceller for receiving said plurality of taps is full.

* * * * *